G. W. HELLSTRAND.
LANTERN.
APPLICATION FILED JUNE 2, 1913.
1,132,090.
Patented Mar. 16, 1915.
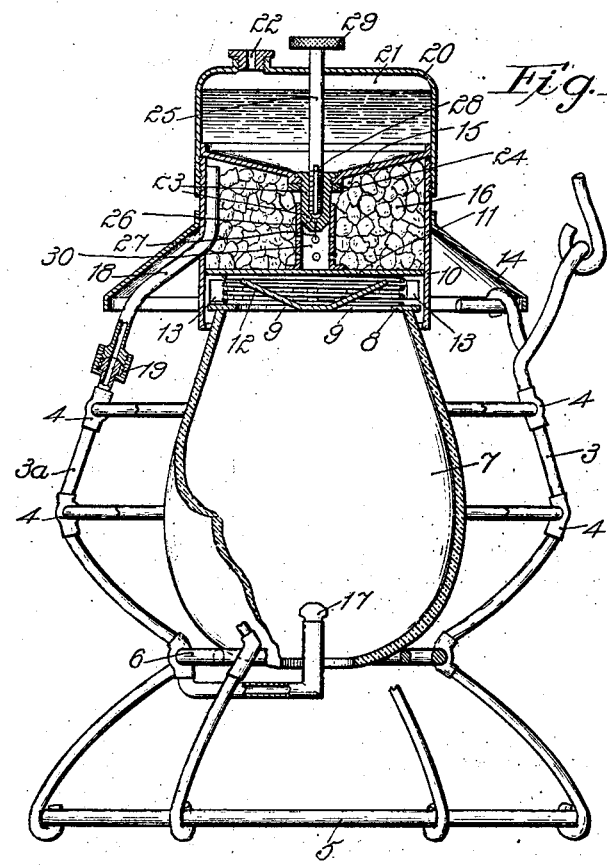
Witnesses:
Robt. F. Brack
August H. Arndt
Inventor
Grover W. Hellstrand
By Brown, Williams, Bell, Hanery & Boettcher
Attorneys

UNITED STATES PATENT OFFICE.

GROVER W. HELLSTRAND, OF CHICAGO, ILLINOIS.

LANTERN.

1,132,090.   Specification of Letters Patent.   Patented Mar. 16, 1915.

Application filed June 2, 1913. Serial No. 771,167.

*To all whom it may concern:*

Be it known that I, GROVER W. HELL-STRAND, a citizen of the United States, residing at Chicago, in the county of Cook and State of Illinois, have invented a certain new and useful Improvement in Lanterns, of which the following is a full, clear, concise, and exact description, reference being had to the accompanying drawings, forming a part of this specification.

My invention relates to lanterns, and contemplates such a device which includes self-contained gas-producing apparatus.

The device of my invention has particular utility as a lantern which is adapted to be carried about and the particular type which I have primarily in mind is the "railroad" type of lantern, where the lantern globe is surrounded by a protecting cage.

It is the further object of my invention to provide a simple and efficient device and, further, to provide a device which will be strong and durable and which will withstand the usual hard usage to which portable lanterns are ordinarily subjected.

It is a further object of my invention to provide elements which are necessarily involved in a gas lantern which will be in such form that they may be applied to the standard types of oil lanterns, and I have drawn some of the appended claims with this idea in view.

In the accompanying drawing Figure 1 is an elevational view thereof, parts being broken away and shown in section in order to clearly reveal the interior construction, and Fig. 2 is a detailed view, which will be referred to.

The protecting cage of my device is illustrated at 3, and comprises vertical and horizontal wires, secured together at the intersections by means of joining pieces 4. The wire of these cages is of substantial diameter and a fairly heavy and sturdy inclosing structure is secured. The cage terminates at the lower end in a base ring 5, and an intermediate ring 6 is provided.

A globe 7 of glass is mounted upon the intermediate ring 6.

A disk 8, preferably of metal, is disposed on the top of the globe 7 and this disk is cut out, as illustrated, in Fig. 2, in order to provide the protected outlet openings 9, 9 for the exit of the products of combustion, it being understood, of course, that the globe 7 has an air entrance below.

A casing 10, preferably of metal, is passed over the top of the globe and the disk, as clearly illustrated. This casing is provided with a transverse partition 11 and a compression spring 12 is disposed between the partition and the disk 8 in order to firmly clamp the disk in place.

Below the partition the circular wall of the casing 10 is provided with slots 13, 13 for the exit of waste gases. An annular canopy 14 is soldered, riveted or otherwise secured to the circular wall of the casing 10 and the upwardly-extending strands of the cage 3 are attached firmly to this canopy. The result is that the parts which have been described, are all securely fastened together.

The casing 10 is provided with a cover 15 and this closes a gas-producing compartment 16.

At least one of the vertical members of the cage is made tubular, and I have illustrated this tubular member at $3^a$. At the bottom this member is extended below and then up into the globe 7 where it is provided with a burner 17. This special piping is connected with a pipe 18 which extends through the wall of the chamber 10 and up to the top of the gas-producing chamber 16, and the bottom of this pipe is joined to the member $3^a$ by means of a union 19.

A hood 20 is screwed over the top of the chamber 10 and this forms a water chamber 21 for which an air inlet 22 is provided.

Some gas-producing material, such as calcium carbid, is disposed in the chamber 16, as illustrated, and the water from the chamber above is fed thereto, for the production of gas, as follows:

The cover 15 has a central opening in which a plug 23 is provided, this plug being secured in place by means of a lock nut 24.

A valve stem 25 extends through the head and the lower end thereof has threaded engagement with an internal bore in this plug. The plug is formed at the bottom into a valve seat 26, which has a central control opening. This opening is governed by a needle valve 27 which extends from the bottom of the stem 25 and the stem 25 is provided with a slot 28 which admits water at all times to the valve seat, the position of the valve determining the opening in the valve seat. The stem 25 is provided with a knurled head 29 on the outside of the hood for the purposes of manipulation. In order to protect the valve, a perforated protecting sleeve 30 is secured upon the top of the partition 11 and extends up around the plug.

It will now be seen that when the water is admitted to the gas-producing chamber the chemical reaction with the calcium carbid will result in the production of acetylene gas, which then passes down the piping 18, 3ª to the burner 17, which is the proper burner, as is well known in the art, for an acetylene flame.

It will be understood that the foregoing is a description of a specific form of my invention, which I present so that those skilled in the art may be instructed in the use of my invention, and I contemplate any changes or modifications which may properly lie within the scope of the appended claims.

I claim:

1. In a lantern, a globe, a disk having openings therein disposed on the top of said globe, a gas producing chamber disposed over said disk, a spring interposed between said gas producing chamber and said disk, and means for securing the gas producing chamber to said globe to clamp the parts in place.

2. In a lantern, a globe, a protecting cage, a gas producer on top of said globe, and a pipe running from said gas producer to a burner in said globe, said pipe forming a part of said protecting cage.

3. In a lantern, a globe, a protecting cage, a gas producer on top of said globe, said producer having a chamber for calcium carbid and a pipe running from said gas producer to a burner in said globe, said pipe forming a part of said protecting cage.

In witness whereof, I hereunto subscribe my name this 29th day of May, A. D., 1913.

GROVER W. HELLSTRAND.

Witnesses:
ALBIN C. AHLBERG,
LEONARD E. BOGER.